(12) United States Patent
Ouchi

(10) Patent No.: US 12,193,052 B2
(45) Date of Patent: Jan. 7, 2025

(54) COMMUNICATION DEVICE, COMMUNICATION METHOD, AND COMPUTER-READABLE STORAGE MEDIUM

(71) Applicant: CANON KABUSHIKI KAISHA, Tokyo (JP)

(72) Inventor: Masatomo Ouchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 472 days.

(21) Appl. No.: 17/411,083

(22) Filed: Aug. 25, 2021

(65) Prior Publication Data

US 2021/0392682 A1 Dec. 16, 2021

Related U.S. Application Data

(63) Continuation of application No. PCT/JP2020/004259, filed on Feb. 5, 2020.

(30) Foreign Application Priority Data

Feb. 28, 2019 (JP) ................. 2019-036407

(51) Int. Cl.
*H04W 74/0808* (2024.01)
*H04L 5/00* (2006.01)
(Continued)

(52) U.S. Cl.
CPC ....... *H04W 74/0808* (2013.01); *H04L 5/0048* (2013.01); *H04L 25/03006* (2013.01); *H04L 2025/03815* (2013.01); *H04W 84/12* (2013.01)

(58) Field of Classification Search
CPC ............ H04L 5/0048; H04L 25/03006; H04L 2025/03815
See application file for complete search history.

(56) References Cited

U.S. PATENT DOCUMENTS

| | | | |
|---|---|---|---|
| 10,588,165 B1 * | 3/2020 | Chu | ...... H04B 7/0452 |
| 2015/0327276 A1 | 11/2015 | Rebeiz | |

(Continued)

FOREIGN PATENT DOCUMENTS

| | | |
|---|---|---|
| JP | 2018-050133 A | 3/2018 |
| JP | 2018-506219 A | 3/2018 |
| WO | 2018/079015 A1 | 5/2018 |

OTHER PUBLICATIONS

International Search Report issued by the Japan Patent Office on Apr. 7, 2020 in corresponding International Application No. PCT/JP2020/004259, with English translation.

(Continued)

*Primary Examiner* — San Htun
(74) *Attorney, Agent, or Firm* — Carter, DeLuca & Farrell LLP

(57) ABSTRACT

A communication device that forms a first Basic Service Set (BSS) communicates a radio frame including a preamble and a data field of a physical layer (PHY). The preamble includes an Extremely High Throughput (EHT) Signal Field (EHT-SIG-A). The EHT-SIG-A includes a subfield for setting a BSS color, and if the communication device and a first other communication device are to cooperatively transmit the radio frame to a second other communication device, a value of this subfield is set, without changing the BSS color used in a first BSS, based on the BSS color of a second BSS to which the second other communication device belongs.

16 Claims, 5 Drawing Sheets

(51) Int. Cl.
  *H04L 25/03* (2006.01)
  *H04W 84/12* (2009.01)

(56) References Cited

U.S. PATENT DOCUMENTS

| | | | |
|---|---|---|---|
| 2016/0330685 A1* | 11/2016 | Asterjadhi | H04L 12/1886 |
| 2017/0257817 A1* | 9/2017 | Itagaki | H04L 69/325 |
| 2017/0273129 A1 | 9/2017 | Ouchi | |
| 2018/0310245 A1 | 10/2018 | Ouchi | |
| 2019/0132872 A1* | 5/2019 | Ko | H04L 47/824 |
| 2019/0268826 A1* | 8/2019 | Sugaya | H04W 48/08 |
| 2019/0357256 A1* | 11/2019 | Kim | H04W 72/0446 |
| 2020/0008185 A1* | 1/2020 | Chen | H04L 69/18 |
| 2021/0250125 A1* | 8/2021 | Park | H04L 27/2603 |

OTHER PUBLICATIONS

LG Electronics, "Consideration on multi-AP coordination for EHT" IEEE 802.11181982r1 (Jan. 2019) pp. 1-5.
Park, E. et al., "Overview of PHY Features for EHT" IEEE (Nov. 2018) pp. 1-22, IEEE 802.11-18/1967r0, XP068133454.
Extended European Search Report issued by the European Patent Office on Oct. 25, 2022 in EP Patent Application No. 20762567.4.

\* cited by examiner

COMMUNICATION DEVICE, COMMUNICATION METHOD, AND COMPUTER-READABLE STORAGE MEDIUM

CROSS-REFERENCE TO RELATED APPLICATIONS

This application is a Continuation of International Patent Application No. PCT/JP2020/004259, filed Feb. 5, 2020, which claims the benefit of Japanese Patent Application No. 2019-036407 filed Feb. 28, 2019, both of which are hereby incorporated by reference herein in their entirety.

BACKGROUND OF THE INVENTION

Field of the Invention

The present invention relates to a communication device, a communication method, and a computer-readable storage medium and, more particularly, to a communication control technique in a wireless LAN.

Background Art

As a communication standard concerning a wireless LAN (Wireless Local Area Network), the IEEE (Institute of Electrical and Electronics Engineers) 802.11 standard is known. In the IEEE802.11ax standard that is the latest standard of the IEEE802.11 standard series, not only a high peak throughput but also improvement of a communication speed under a congestion situation is implemented using OFDMA (Orthogonal Frequency-Division Multiple Access) (see PTL 1).

Currently, in order to further improve throughput, a study group called IEEE802.11EHT (Extremely High Throughput) has been formed as a successor standard of IEEE802.11ax. In the EHT, to achieve throughput improvement, a Multi-AP Coordination configuration in which a plurality of access points (APs) arranged while being spatially distributed cooperatively transmit data to a single STA (Station) has been examined.

CITATION LIST

Patent Literature

PTL 1: Japanese Patent Laid-Open No. 2018-050133

In the IEEE802.11ax standard, use of identification information called BSS (Basic Service Set) color is defined. If a communication device receives a radio frame in which the same BSS color as the BSS color of an AP connected to the self-device is set, the radio frame is handled as a frame of Intra-BSS. On the other hand, in the IEEE802.11EHT, use of the Multi-AP Coordination configuration has been examined, as described above. How to set the BSS color in this case is not clear yet.

SUMMARY OF THE INVENTION

The present invention provides a technique of appropriately executing a setting for causing a plurality of access points to concurrently transmit data to a terminal.

According to one aspect of the present invention, there is provided a communication device that forms a first Basic Service Set (BSS), and transmits a radio frame including a preamble and a data field of a physical layer (PHY), characterized in that the preamble includes a Legacy Short Training Field (L-STF), a Legacy Long Training Field (L-LTF) arranged immediately after the L-STF in the radio frame, a Legacy Signal Field (L-SIG) arranged immediately after the L-LTF in the radio frame, an Extremely High Throughput (EHT) Signal Field (EHT-SIG-A) arranged after the L-SIG in the radio frame, an EHT Short Training Field (EHT-STF) arranged after the EHT-SIG-A in the radio frame, and an EHT Long Training Field (EHT-LTF) arranged immediately after the EHT-STF in the radio frame, the EHT-SIG-A includes a subfield for setting a BSS color, and if the communication device and a first other communication device are to cooperatively transmit the radio frame to a second other communication device, a value of the subfield is set, without changing the BSS color used in a first BSS, based on the BSS color of a second BSS to which the second other communication device belongs.

Further features of the present invention will become apparent from the following description of exemplary embodiments with reference to the attached drawings.

DESCRIPTION OF THE EMBODIMENTS

Figure 1:
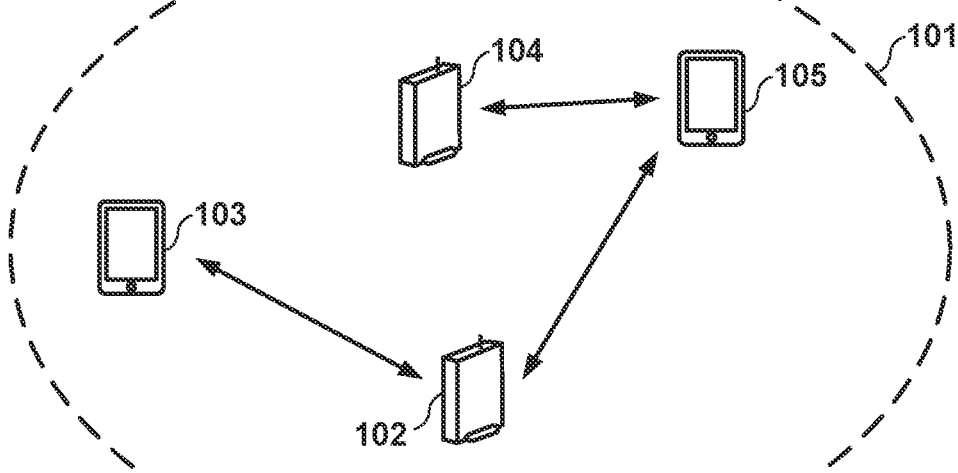
FIG. 1 is a view showing an example of the configuration of a network.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(Network Configuration)

FIG. 1 shows an example of the configuration of a wireless communication network according to this embodiment. This wireless communication network is configured to include access points (an AP 102 and an AP 104) and terminals (an STA 103 and an STA 105), which are IEEE802.11EHT (Extremely High Throughput) devices. In the following description, in a case in which a specific device is not referred to or the like, the access point may be referred to as "AP" and the station may be referred to as "STA" without reference numerals. Note that in FIG. 1, the wireless communication network including two APs and two STAs is shown as an example, but the numbers of communication devices may be, for example, three or more. In FIG. 1, the communicable area of the network formed by the AP 102 and the AP 104 is indicated by a circle 101. Note that this communicable area may cover a larger area, or may cover only a smaller area. In addition, although FIG. 1 shows STAs complying with the IEEE802.11EHT standard, an STA that supports only a standard (legacy standard) of a generation before the IEEE802.11EHT standard may exist. Note that it may be understood that EHT is an acronym of Extreme High Throughput.

Note that in this example, each of the AP 102 and the AP 104 can receive a signal transmitted from the other AP. Note that the connection form is not particularly limited, and the AP 102 and the AP 104 may be connected by a wire or wirelessly. The AP 102 and the AP 104 support the Multi-AP Coordination configuration of the IEEE802.11EHT and can cooperatively concurrently transmit data to one STA. For example, the STA 105 can concurrently transmit/receive radio frames to/from the AP 102 and the AP 104, which cooperatively operate. The STA 105 can be configured to, for example, include a plurality of wireless LAN control units and transmit/receive radio frames to/for a plurality of APs using different radio channels. Note that the STA 105 may include one physical control unit capable of processing a plurality of frames concurrently received via a plurality of radio channels. That is, the STA 105 has a configuration capable of logically concurrently processing a plurality of wireless communications physically using one or a plurality of control devices.

(Device Configuration)

Figure 2:
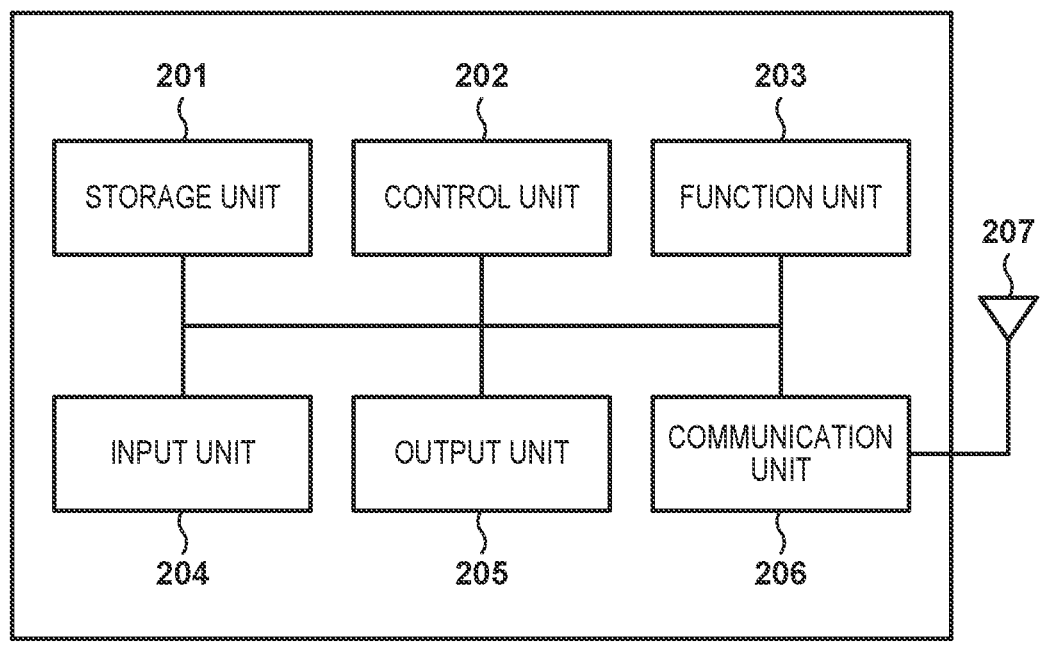
FIG. 2 is a block diagram showing an example of the hardware configuration of an AP or an STA.

FIG. 2 shows the hardware configuration of each of the APs (the AP 102 and the AP 104) and the STAs (the STA 103 and the STA 105). The communication device includes, as an example of its hardware configuration, a storage unit 201, a control unit 202, a function unit 203, an input unit 204, an output unit 205, a communication unit 206, and an antenna 207.

The storage unit 201 is formed by both of a ROM and a RAM or one of them, and stores programs for performing various kinds of operations to be described later and various kinds of information such as communication parameters for wireless communication. Note that other than the memories such as a ROM and a RAM, a storage medium such as a flexible disk, a hard disk, an optical disk, a magnetooptical disk, a CD-ROM, a CD-R, a magnetic tape, a nonvolatile memory card, or a DVD may be used as the storage unit 201.

The control unit 202 is formed by, for example, a processor such as a CPU or an MPU, an ASIC (Application Specific Integrated Circuit), a DSP (Digital Signal Processor), an FPGA (Field Programmable Gate Array), or the like. Here, CPU is an acronym of Central Processing Unit, and MPU is an acronym of Micro Processing Unit. The control unit 202 executes the programs stored in the storage unit 201, thereby controlling the entire device. Note that the control unit 202 may control the entire device by cooperation of the programs stored in the storage unit 201 and an OS (Operating System).

In addition, the control unit 202 controls the function unit 203 to execute predetermined processing such as image capturing, printing, or projection. The function unit 203 is hardware used by the device to execute predetermined processing. For example, if the device is a camera, the function unit 203 is an image capturing unit and performs image capturing processing. For example, if the device is a printer, the function unit 203 is a printing unit and performs print processing. For example, if the device is a projector, the function unit 203 is a projection unit and performs projection processing. Data to be processed by the function unit 203 may be data stored in the storage unit 201, or may be data communicated with another AP or STA via the communication unit 206 to be described later.

The input unit 204 accepts various kinds of operations from a user. The output unit 205 performs various kinds of outputs for the user. Here, the output by the output unit 205 includes, for example, at least one of display on a screen, audio output by a loudspeaker, vibration output, and the like. Note that both the input unit 204 and the output unit 205 may be implemented by one module, like a touch panel.

The communication unit 206 controls wireless communication complying with the IEEE802.11 standard series, or controls IP communication. In this embodiment, the communication unit 206 can execute processing complying with at least the IEEE802.11EHT standard. In addition, the communication unit 206 controls the antenna 207 to transmit and receive radio signals for wireless communication. The device communicates contents such as image data, document data, or video data with another communication device via the communication unit 206. The antenna 207 is an antenna that can transmit and receive signals in at least any one of, for example, a sub-GHz band, 2.4 GHz band, 5 GHz band, and 6 GHz band. Note that the frequency band (and a combination of frequency bands) to which the antenna 207 is adaptable is not particularly limited. The antenna 207 may be one antenna, or may be a set of two or more antennas to perform MIMO (Multi-Input and Multi-Output) transmission/reception. FIG. 2 shows one antenna 207, but the antenna may include two or more antennas (two or more sets of antennas) that are adaptable to different frequency bands. The antenna 207 is configured to be adaptable to communication of Distributed Coordination of the IEEE802.11EHT standard. For example, the AP has a configuration capable of transmitting D-MIMO (Distributed MIMO) for JTX (Joint Transmission).

Note that JTX is one element used to implement the Multi-AP Coordination function that is expected to be newly introduced from the IEEE802.11EHT, and indicates that a plurality of APs cooperatively concurrently transmit data to one STA. The Multi-AP Coordination function is a function of making a plurality of APs cooperatively operate to improve transmission/reception throughput or signal strength on the STA side. As a wireless technology at this time, D-MIMO can be used. D-MIMO is a technique of causing a plurality of APs to communicate with one STA at the same time and same frequency channel (for example, in the same RU (Resource Unit) of OFDMA (Orthogonal Frequency-Division Multiple Access)). According to D-MIMO, since the space use efficiency is improved, high-speed communication can be implemented. The minimum configuration of D-MIMO includes an M-AP (master AP), an S-AP (slave AP), and an STA. In this case, under the control of the M-AP, the two APs, that is, the M-AP and the S-AP cooperatively concurrently (simultaneously) transmit radio frames to one STA.

Figure 3:
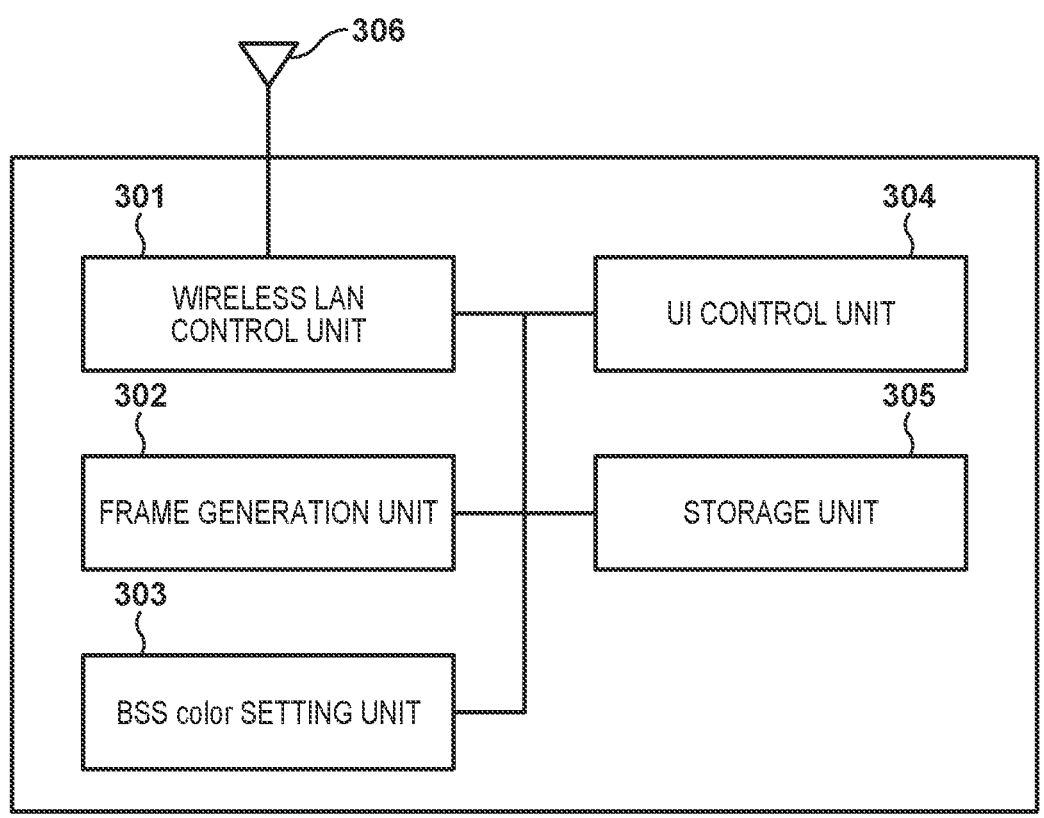
FIG. 3 is a block diagram showing an example of the functional configuration of the AP or the STA.

FIG. 3 shows an example of the functional configuration of each of the communication devices (the AP 102 and the AP 104). As an example, the AP includes a wireless LAN control unit 301, a frame generation unit 302, a BSS color setting unit 303, a UI control unit 304, a storage unit 305, and an antenna 306.

The wireless LAN control unit 301 is configured to include circuits that transmit/receive radio signals to/from another wireless LAN device (for example, another AP or STA), and programs configured to control these. The wireless LAN control unit 301 executes communication control of wireless LAN such as transmission of a frame generated by the frame generation unit 302 and reception of a radio frame from another wireless LAN device in accordance with the IEEE802.11 standard series. The frame generation unit 302 generates a radio frame to be transmitted by the wireless LAN control unit 301 based on, for example, data that is received from another AP and should be transmitted to an STA. In addition, the frame generation unit 302 generates, for example, a radio frame including data that another AP should transmit to an STA or a trigger frame (JTX TF) for instructing the timing of transmitting the radio frame including the data to the STA.

The BSS color setting unit 303 sets the BSS color of a radio frame. For example, when the self-device (the AP 102 or the AP 104) forms a BSS (Basic Service Set), the BSS color setting unit 303 sets a BSS color to be used in the BSS. The BSS color setting unit 303 sets the value of the BSS color for a radio frame to be transmitted to the STA connected to the self-device. On the other hand, when performing data transmission by JTX to an STA connected to another AR the BSS color setting unit 303 sets a BSS color used in the BSS formed by the other AP for the radio frame to be transmitted to the STA. That is, when transmitting a radio frame to an STA connected to another AP different from the self-device by JTX, the BSS color setting unit 303 uses not the BSS color used in the BSS formed by the self-device but the BSS color of the other AP. According to this, a plurality of radio frames received by the STA can be handled as radio frames in which the BSS color used in the BSS connected to the STA is set. For this reason, the STA can handle all of a plurality of radio frames received from a plurality of APs as Intra-BSS frames. On the other hand, since the BSS color setting unit 303 sets the BSS color of the BSS formed by the self-device for a radio frame other than JTX, the STA connected to the other AP can handle the radio frame as an Inter-BSS frame. Note that the STA can execute different control processes depending on whether a received radio frame is an Intra-BSS frame or an Inter-BSS frame. For example, if the reception power of a radio frame does not exceed a predetermined value, the STA can transmit the radio frame. A predetermined value concerning the Inter-BSS frame can be set to a value higher than a predetermined value concerning an Intra-BSS frame. According to this, even if a radio frame is received by power more than the predetermined value concerning an Intra-BSS frame, the STA may have a transmission opportunity if the radio frame is a radio frame of Inter-BSS. For this reason, when the AP uses a BSS color different from that of another AP at time other than JTX, the communication opportunity of the STA connected to the other AP can be increased, and the frequency use efficiency of the entire system can be improved.

The UI control unit 304 is configured to include hardware concerning user interfaces (UIs) such as a touch panel and buttons configured to accept an operation on the AP by the user (not shown) of the AP, and programs configured to control these. Note that the UI control unit 304 also has a function of, for example, presenting information to the user, such as display of an image or the like or audio output. The storage unit 305 is configured to include a storage device such as a ROM (Read Only Memory) or a RAM (Random Access Memory) configured to store programs to be executed by the communication device and various kinds of data.

Note that the STA has the functions of a general STA. The STA can have a function of receiving a radio frame transmitted by the Multi-AP Coordination configuration.

(Frame Structure)

Figure 4:
FIG. 4 is a view showing an example of the PHY frame structure of an EHT SU PPDU.
Figure 5:
FIG. 5 is a view showing an example of the PHY frame structure of an EHT ER PPDU.
Figure 6:
FIG. 6 is a view showing an example of the PHY frame structure of an EHT MU PPDU.

An example of the structure of a PPDU (Physical Layer (PHY) Protocol Data Unit) complying with the IEEE802.11EHT standard will be described with reference to FIGS. 4 to 6. FIG. 4 shows an example of an EHT SU (Single User) PPDU that is a PPDU for single-user communication, and FIG. 5 shows an example of an EHT MU (Multi User) PPDU for multi-user communication. FIG. 6 shows an example of an EHT ER (Extended Range) PPDU for long distance transmission. The EHT ER PPDU is used when the communication area should be extended in communication between an AP and a single STA. Note that the fields of the PPDU need not always be arranged in the orders shown in FIGS. 4 to 6, and may include new fields that are not shown in FIGS. 4 to 6.

The PPDU includes fields including an STF (Short Training Field), an LTF (Long Training Field), and a SIG (Signal Field). As shown in FIG. 4, the head portion of the PPDU includes an L (Legacy)-STF 401, an L-LTF 402, and an L-SIG 403 for ensuring backward compatibility with the IEEE802.11a/b/g/n/ax standards. Note that each of frame formats shown in FIGS. 5 and 6 includes an L-STF (L-STF 501 or L-STF 601), an L-LTF (L-LTF 502 or L-LTF 602), and an L-SIG (L-SIG 503 or RL-SIG 603). Note that the L-LTF is arranged immediately after the L-STF, and the L-SIG is arranged immediately after the L-LTF. Note that each of the structures shown in FIGS. 4 to 6 further includes an RL-SIG (Repeated L-SIG, an RL-SIG 404, RL-SIG 504, or RL-SIG 604) arranged immediately after the L-SIG In the RL-SIG field, the contents of the L-SIG are repeatedly transmitted. The RL-SIG is used to enable a receiver to recognize that this PPDU complies with a standard after the IEEE802.11ax standard, and may be omitted in IEEE802.11EHT in some cases. In addition, a field for enabling the receiver to recognize that this PPDU complies with the IEEE802.11EHT may be provided in place of the RL-SIG The L-STF 401 is used for detection of a physical layer (PHY) frame, AGC (Automatic Gain Control), timing detection, or the like. The L-LTF 402 is used for highly accurate frequency/time synchronization, obtainment of propagation channel information (CSI: Channel State Information), or the like. The L-SIG 403 is used for transmitting control information including information such as a data transmission rate and a PHY frame length. A legacy device complying with the IEEE802.11a/b/g/n/ax standards can decode the above-described various kinds of legacy fields.

Each PPDU further includes an more EHT-SIG (EHT-SIG-A 405, EHT-SIG-A 505, EHT-SIG-B 506, or EHT-SIG-A 605) arranged immediately after the RL-SIG and used for transmitting control information for EHT. Each PPDU further includes an STF for EHT (EHT-STF 406, 507, or 606) and an LTF for EHT (EHT-LTF 407, 508, or 607). Each PPDU includes, after these controlling fields, a data field 408, 509, or 608 and a Packet extension field 409, 710, or 609. The portion including the fields from the L-STF to the EHT-LTF of each PPDU is referred to as a PHY preamble.

Note that each of FIGS. 4 to 6 shows the PPDU that can ensure the backward compatibility as an example. However, if it is unnecessary to ensure the backward compatibility, for example, the legacy fields may be omitted. In this case, for example, the EHT-STF and EHT-LTF are used in place of the L-STF and the L-LTF to establish synchronization. In this case, the EHT-STF and one of the plurality of EHT-LTFs after the EHT-SIG field can be omitted.

The EHT-SIG-A 405 and 605 included in the EHT SU PPDU and the EHT ER PPDU include an EHT-SIG-A1 and an EHT-SIG-A2 necessary for reception of the PPDU, respectively, as shown in Tables 1 and 2 below. A 6-bit "BSS color" subfield is included in the EHT-SIG-A1. Also, the EHT-SIG-A 505 of the EHT MU PPDU shown in FIG. 5 includes an EHT-SIG-A1 and an EHT-SIG-A2 necessary for reception of the PPDU as shown in Tables 3 and 4 below. In the PPDU as well, a 6-bit "BSS color" subfield is included in the EHT-SIG-A1. Note that the configurations of Tables 1 to 4 are merely examples, and information other than the information shown in these tables may be included in the EHT-SIG field, and some of the pieces of information shown in these tables may be excluded from the EHT-SIG field.

TABLE 1

| | Bit Position | Subfield | Bit Count | Description |
|---|---|---|---|---|
| EHT-SIG-A1 | B0 | Format | 1 | "1" is set for an EHT PPDU and an EHT ER PPDU to distinguish them from an EHT TB PPDU. |
| | B1 | Beam Change | 1 | "1" is set if the pre-EHT of the PPDU is arranged in a space different from the first symbol of the EHT-LTF, or "0" is set if the pre-EHT is mapped similarly to the first symbol. |
| | B2 | UL/DL | 1 | This subfield indicates whether the PPDU is for UL or DL, and has the same value as TXVECTOR UPLINK_FLAG |
| | B3-B6 | MCS | 4 | This subfield indicates the value of the Modulation and Coding Scheme. In a case of an EHT SU PPDU, n = 0, 1, 2, . . . , 11 (12 to 15 are reserved). In a case of an EHT ER SU PPDU and Bandwidth = 0, n = 0, 1, 2 (3 to 15 are reserved areas). In a case of an EHT ER SU PPDU and Bandwidth = 1, n = 0 for MCS 0 (1 to 15 are reserved areas). |
| | B7 | DCM | 1 | This subfield indicates whether Dual Carrier Modulation is applied to the data field. If "0" is set in the STK field, "1" is set. (If both the DCM and STBC fields are "1", neither of them is applied) If DCM is not applied, "0" is set. |
| | B8-B13 | BSS Color | 6 | 6-bit number for identifying the BSS |
| | B14 | Reserved | 1 | Reserved field |
| | B15-B18 | Spatial Reuse | 4 | This subfield indicates whether Spatial Reuse is allowed during transmission of this PPDU. The value of Spatial Reuse field encoding shown in the separate table is set. |
| | B19-B20 | Bandwidth | 2 | In a case of an EHT SU PPDU: "0" is set for 20 MHz, "1" is set for 40 MHz, "2" is set for 80 MHz, or "3" is set for 160 MHz (80 + 80 MHz). In a case of an EHT ER SU PPDU: "0" is set for 242-tone RU, or "1" is set for upper 106-tone RU of 20 MHz. |
| | B21-B22 | GI + LTF Size | 2 | This subfield indicates the Guard Interval period and the EHT-LTF size. "0" is set for 1 × EHT-LTF and 0.8 μs GI, "1" is set for 2 × EHT-LTF and 0.8 μs GI, "2" is set for 2 × EHT-LTF and 1.6 μs GI, "3" is set if both the DCM and STBC fields are "1" and for 4 × EHT-LTF and 0.8 μs GI, or "3" is set for 4 × EHT-LTF other than the above case and 3.2 μs GI. |

TABLE 1-continued

| | Bit Position | Subfield | Bit Count | Description |
|---|---|---|---|---|
| | B23-B25 | NSTS And Midamble Periodicity | 2 | This subfield indicates the number of space-time streams and the midamble period for frame synchronization. If the Doppler field is "0", "(the number of space-time streams)—1" is set. If the Doppler field is "1", B23 and B24 indicate the number of space-time streams. B25 is "0" if the midamble period is 10, or "1" if the midamble period is 20. |

TABLE 2

| | Bit Position | Subfield | Bit Count | Description |
|---|---|---|---|---|
| EHT-SIG-A2 | B0-B6 | TXOP | 1 | Transmission Opportunity If TXOP_DURATION of TXVECTOR is UNSPECIFIED and there is no period information, 127 is set. If TXOP_DURATION of TXVECTOR is smaller than 512, a value smaller than 127 is set to set NAV. At this time, if B0 is "0", FLOOR of TXOP_DURATION/8 (round down) is set in B1 to B6. If B0 is "1", FLOOR of (TXOP_DURATION— 512)/8 is set in B1 to B6. |
| | B7 | Coding | 1 | "0" is set for BCC (Binary Convolutional Code), or "1" is set for LDPC (Low Density Parity Check). |
| | B8 | LDPC Extra Symbol Segment | 1 | This subfield indicates the presence/absence of an extra OFDM symbol segment for LDPC. |
| | B9 | STBC | 1 | "1" is set in this field if STBC (Space-Time Block Coding) is used and the DCM subfield is "0", "1" is also set if neither DCM nor STBC is applied, or "0" is set otherwise. |
| | B10 | Beamformed | 1 | "1" is set if beamforming steering is applied to the waveform of SU transmission. |
| | B11-B12 | Pre-FEC Padding Factor | 2 | "0" is set if the Pre-FEC Padding Factor is 4, "1" is set if the Pre-FEC Padding Factor is 1, "2" is set if the Pre-FEC Padding Factor is 2, or "3" is set if the Pre-FEC Padding Factor is 3. |
| | B13 | PE Disambiguity | 1 | Disambiguity field of Packet Extension |
| | B14 | Reserved | 1 | Reserved field |
| | B15 | Doppler | 1 | "1" is set if either of the following conditions is met: the number of OFDM symbols in the data field is larger than "the value indicated by the midamble period + 1", and a midamble exists, and the number of OFDM symbols in the data field is equal to or smaller than "the value indicated by the midamble period + 1", no midamble exists, and the channel changes rapidly. |
| | B16-B19 | CRC | 4 | The CRC of the EHT-SIG-A (26 bits of A1 and 16 bits up to B15 of A2, that is, 42 bits in total) field up to here. |
| | B20-B25 | Tail | 6 | An area to set "0" to indicate the end portion to a trellis convolution decoder |

TABLE 3

| Bit Position | Subfield | Bit Count | Description |
|---|---|---|---|
| EHT-SIG-A1 B0 | UL/DL | 1 | This subfield indicates whether the PPDU is for UL or DL, and has the same value as TXVECTOR UPLINK_FLAG |
| B1-B3 | SIGB MCS | 3 | This subfield indicates the MCS of the EHT-SIG-B field. "0" is set for MCS 0, "1" is set for MCS 1, "2" is set for MCS 2, "3" is set for MCS 3, "4" is set for MCS 4, or "5" is set for MCS 5. "6" and "7" are reserved areas. |
| B4 | SIGB DCM | 1 | "1" is set if the HT-SIG-B field is modulated using DCM. |
| B5-B10 | BSS Color | 6 | 6-bit number for identifying the BSS |
| B11-B14 | Spatial Reuse | 4 | This subfield indicates whether Spatial Reuse is allowed during transmission of this PPDU. The value of Spatial Reuse field encoding shown in the separate table is set. |
| B15-B17 | Bandwidth | 3 | "0" is set for 20 MHz, "1" is set for 40 MHz, or "3" is set for 160 MHz (80 + 80 MHz). When the SIGB Compression field is "0", "4" is set if only the secondary 20 MHz is puncturing in 80 MHz preamble puncturing, "5" is set if two 20 MHz of the secondary 40 MHz are puncturing in 80 MHz preamble puncturing. "6" is set if only the secondary 20 MHz is puncturing in 160 (or 80 + 80) MHz preamble puncturing, or "7" is set if only the secondary 40 MHz is puncturing in 160 (or 80 + 80) MHz preamble puncturing. If the SIGB field is "1", the value between "4" to "7" means "reserved". |
| B18-B21 | Number of EHT-SIG-B Symbols or MU-MIMO Users | 4 | When the SIGB Compression field is "0", this subfield indicates the number of OFDMA symbols in the EHT-SIG-B. If the number of OFDM symbols in the EHT-SIG-B is smaller than 16, the number obtained by subtracting 1 from the number of OFDM symbols in the EHT-SIG-B is set. If at least one receiving terminal has set the capability of supporting the number of EHT SIG-B OFDM symbols larger than 16 to "0", "15" is set to indicate that the number of OFDM symbols in the EHT-SIG-B is 16. If all the receiving terminals have set the capability of supporting the number of EHT SIG-B OFDM symbols larger than 16 to "0" and the data rate of the EHT-SIG-B is smaller than MCS 4 which does not use DCM, "15" is set to indicate that the number of OFDM symbols in the EHT-SIG-B is equal to or larger than 16. When the SIGB Compression field is "1", the value set here means the number obtained by subtracting 1 from the number of MU-MIMO users. |
| B22 | SIG Compression | 1 | "1" is set if a Common field exists in the EHT-SIG-B. |
| B23-B24 | Gi + LTF Size | 2 | This subfield indicates the Guard Interval period and the EHT-LTF size. "0" is set for 4 × EHT-LTF and 0.8 μs GI, "1" is set for 2 × EHT-LTF and 0.8 μs GI, "2" is set for 2 × EHT-LTE and 1.6 μs GI, or "3" is for 4 × EHT-LTE and 3.2 μs GI. |
| B25 | Doppler | 1 | "1" is set if either of the following conditions is met: the number of OFDM symbols in the data field is larger than "the value indicated by the midamble period + 1", and a midamble exists, and the number of OFDM symbols in the data field is equal to or smaller than "the value indicated by the midamble period + 1", no midamble exists, and the channel changes rapidly. |

TABLE 4

| Bit Position | Subfield | Bit Count | Description |
|---|---|---|---|
| EHT-SIG-A2 B0-B6 | TXOP | 1 | Transmission Opportunity If TXOP_DURATION of TXVECTOR is UNSPECIFIED and there is no period information, 127 is set. If TXOP_DURATION of TXVECTOR is smaller than 512, a value smaller than 127 is set to set NAV. At this time, if B0 is "0", FLOOR of TXOP_DURATION/8 (round down) is set in B1 to B6. If B0 is "1", FLOOR of (TXOP_DURATION—512)/8 is set in B1 to B6. |
| B7 | Reserved | 1 | Reserved field |
| B8-B10 | Number of EHT-LTF Symbols And Midamble Periodicity | 3 | This subfield indicates the number of EHT-LTFs. "0" is set for one EHT-LTF, "1" is set for two EHT-LTFs, "2" is set for four EHT-LTFs, "3" is set for six EHT-LTFs, or "4" is set for eight EHT-LTFs. When the Doppler field is "1", B8 and B9 indicate the number of EHT-LTF symbols, and B10 indicates the midamble period. |
| B11 | LDPC Extra Symbol Segment | 1 | This subfield indicates the presence/absence of an extra OFDM symbol segment for LDPC. |
| B12 | STBC | 1 | When the number of users of each RU (Resource Unit) is not larger than 1, "1" is set to indicate that STBC is used for encoding. |
| B13-B14 | Pre-FEC Padding Factor | 2 | "0" is set if the Pre-FEC Padding Factor is 4, "1" is set if the Pre-FEC Padding Factor is 1, "2" is set if the Pre-FEC Padding Factor is 2, or "3" is set if the Pre-FEC Padding Factor is 3. |
| B15 | PE Disambiguily | 1 | Disambiguity field of Packet Extension |
| B16-B19 | CRC | 4 | The CRC of the EHT-SIG-A (26 bits of A1 and 16 bits up to B15 of A2, that is, 42 bits in total) field up to here. |
| B20-B25 | Tail | 6 | An area to set "0" to indicate the end portion to a trellis convolution decoder. |

(Procedure of Processing)

Figure 7:
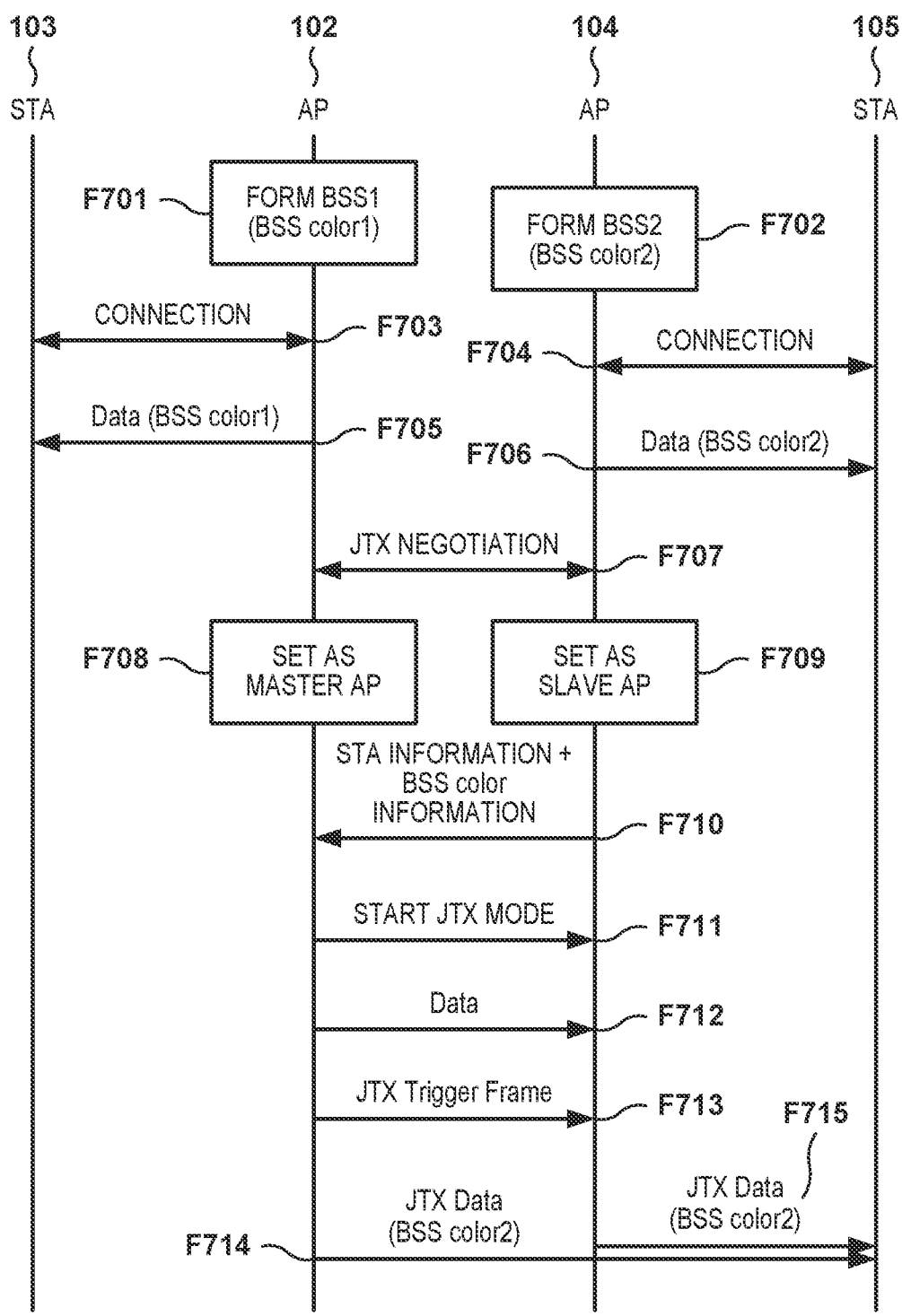
FIG. 7 is a sequence chart showing an example of the procedure of processing executed in the network.
Figure 8:
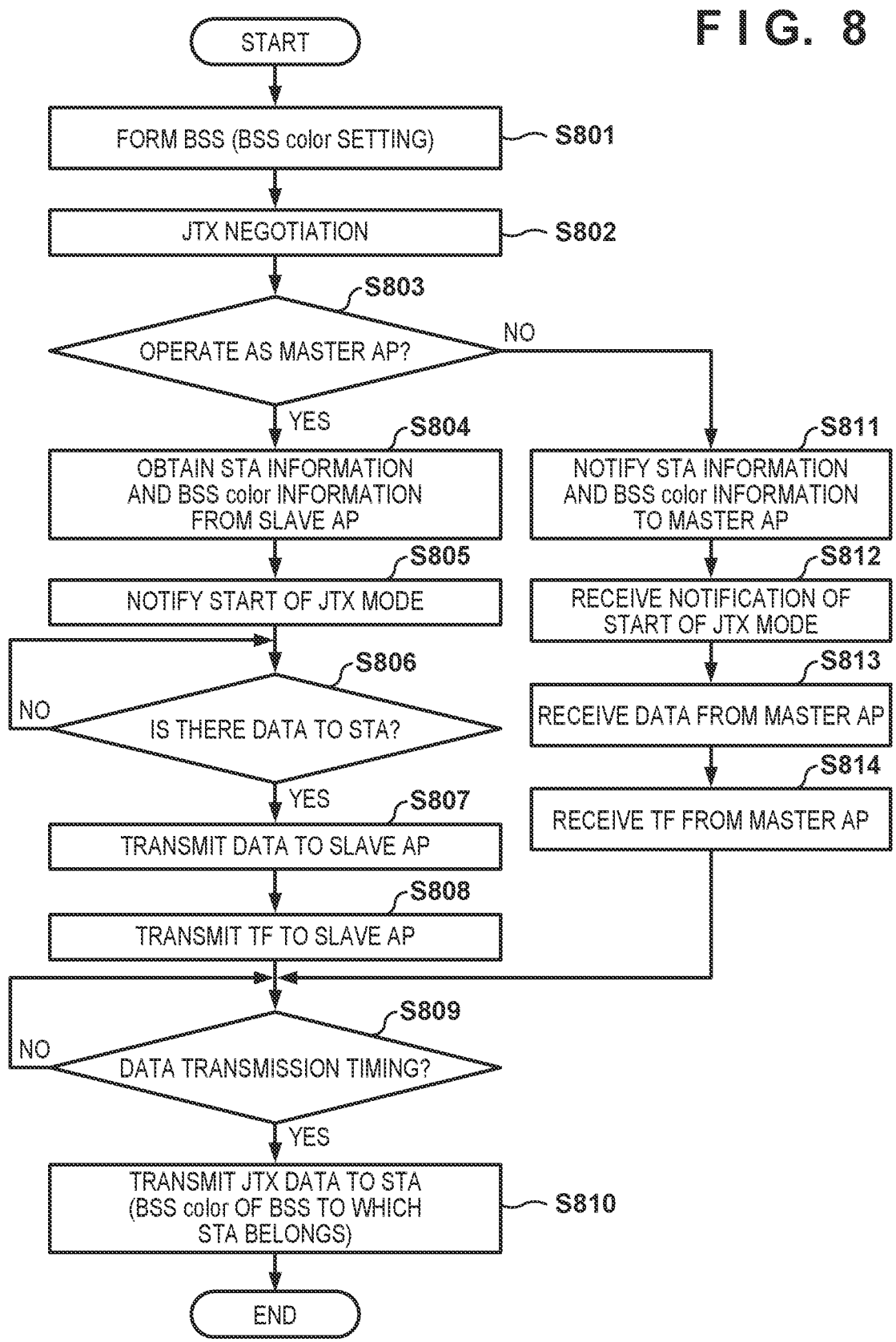
FIG. 8 is a flowchart showing an example of the procedure of processing executed in the AP.

Examples of the procedure of processing executed by an AP as described above and the procedure of processing executed by a wireless communication network will be described next with reference to FIGS. 7 and 8. FIG. 7 shows an example of the procedure of processing in the wireless communication network, and FIG. 8 shows an example of the procedure of processing executed by the AP 102 and the AP 104.

First, the AP 102 forms a first BSS (BSS1) (F701, step S801). Note that in this embodiment, a setting for using BSS color1 is done in the BSS1. Also, the AP 104 forms a second BSS (BSS2) (F702, step S801). Here, in this embodiment, a setting for using BSS color2 different from BSS color1 is done in the BSS2. Each AP notifies Beacon of IEEE802.11 at a predetermined period and accepts a connection request from the STA, thereby setting a state in which the AP mediates communication between the STA and another STA or between the STA and a DS (Distribution System).

The AP 102 executes a connection procedure with the STA 103 and transitions to a connected state (F703). Similarly, the AP 104 executes a connection procedure with the STA 105 and transitions to a connected state (F704). With this connection procedure, the AP notifies the STA of the information of the operation state, as in IEEE802.11ax. The information of the operation state includes the value of the BSS color. The BSS color is 6-bit information for identifying the BSS included in the preamble of the physical layer (PHY), as described above. Based on the value of the BSS color, the STA can ascertain whether a received radio frame is a frame of a BSS (intra-BSS) to which the STA belongs or a frame of a BSS (inter-BSS) to which the STA does not belong.

The AP 102 can transmit a radio frame to the STA 103 (F705). This radio frame is a PPDU shown in one of FIGS. 4 to 6, and a value indicating BSS color1 used in the BSS1 is stored in the BSS color subfield. Similarly, the AP 104 can transmit a radio frame to the STA 105 (F706). This radio frame is a PPDU shown in one of FIGS. 4 to 6, and a value indicating BSS color2 used in the BSS2 is stored in the BSS color subfield. In a case of an EHT SU PPDU or EHT ER PPDU, the BSS color subfield is formed by the ninth to 14th bits (B8 to B13) of EHT-SIG-A1, as shown in the above-described table. In a case of an EHT MU PPDU, the BSS color subfield is formed by the sixth to 11th bits (B5 to B10) of EHT-SIG-A1.

After that, the AP 102 and the AP 104 decide to cooperatively concurrently perform data transmission to a common STA. For example, upon detecting that there exists an enormous amount of data to be transmitted to the STA 105, the AP 104 can decide to transmit the data to the STA 105 cooperatively with the AP 102 that is another AP existing on the periphery. Also, even if there does not exist a plan of a mass data communication to a specific STA, the AP 102 or the AP 104 may decide to prepare for cooperative transmission with another AP in preparation for occurrence of mass data communication in the future. If it is decided to perform cooperative transmission by a plurality of APs or make a preparation for that, the AP 102 and the AP 104 perform a negotiation for JTX (Joint Transmission) (F707, step S802). Note that the negotiation for JTX will sometimes simply be referred to as "negotiation" hereinafter. In the negotiation, the AP that executes the negotiation can decide whether to operate as an M-AP or an S-AP. Here, the AP 102 decides to operate as an M-AP (F708, YES in step S803), and the AP 104 decides to operate as an S-AP (F709, NO in step S803). Additionally, in this negotiation, which AP should be associated with the STA as the target of JTX may be decided.

After the end of the negotiation, the AP 104 serving as the S-AP notifies the AP 102 serving as the M-AP of the information of the STA 105 connected to the self-device and the information of BSS color2 used in the BSS2 formed by the self-device (F710, steps S804 and S811). Here, the information of the STA can include the information of the MAC (Medium Access Control) address of the STA, and the like. Note that these pieces of information may be notified from the S-AP to the M-AP at another timing such that, for example, the pieces of information are exchanged between the APs at the time of negotiation. Also, the AP 102 may notify the AP 104 of the information of the STA 103 connected to the self-device and the information of BSS color1 used in the BSS1 formed by the self-device. Furthermore, if the AP 102 and the AP 104 perform JTX to transmit data to a specific STA, the AP connected to the STA may notify the other AP of the information of the STA and the information of the BSS color. However, since the M-AP can designate the STA as the data transmission target and the BSS color in transmission of transmission target data or a JTX trigger frame to be described later, the information need not always be provided from the M-AP to the S-AP.

After that, the AP 102 notifies the AP 104 operating as the S-AP of the start of the JTX mode (F711, steps S805 and S812). After that, when transmission target data to the STA 105 is generated (YES in step S806), the transmission target data is transmitted from the AP 102 to the AP 104 (F712, steps S807 and S813). Instead of immediately transmitting the received data to the STA 105, the AP 104 temporarily holds the received data because it is operating in the JTX mode.

Note that at the time of transmission of the transmission target data from the M-AP to the S-AP, the information of the BSS color to be used may be notified from the M-AP to the S-AP. In this embodiment, since the data is transmitted by JTX to the STA 105, BSS color2 used in the AP 104 connected to the STA 105 can be notified as the information of the BSS color to be used. Note that if the BSS color to be used matches the BSS color used in the S-AP, or the BSS color to be used by JTX is known in advance, the information of the BSS color need not be notified from the M-AP to the S-AP. That is, if the data is transmitted by JTX to the STA connected to the S-AP, or the information of the BSS color is exchanged with the STA as the data transmission target of JTX, the M-AP need not notify the S-AP of the information of the BSS color. Note that, for example, when performing data transmission to the STA 103 by JTX, the AP 102 can notify the AP 104 of BSS color1 as the information of the BSS color to be used. Note that if data is transmitted by the above-described PPDU, the information of the BSS color to be used is notified because the PPDU includes a PHY preamble for notifying the BSS color. In this case, the S-AP receives a radio frame for which a BSS color different from the BSS color used by the self-device is set. However, since the S-AP is operating in the JTX mode, the data in the radio frame is not discarded.

After transmission/reception of the transmission target data, the AP 102 transmits a JTX trigger frame (TF) to the AP 104 to cause the AP 104 to transmit a radio frame including the transmission target data (F713, steps S808 and S814). By the JTX TF, the AP 102 can instruct the AP 104 to transmit the radio frame to the STA 105 and designate the timing of transmission. For example, at the timing designated by the JTX TF (YES in step S809), the AP 102 and the AP 104 concurrently transmit the data to the STA 105 (F714, F715, step S810). Note that the transmission timing can be a timing after the elapse of a predetermined time (SIFS, Short Inter Frame Space) from transmission/reception of the JTX TF. In this case, the transmission timing is instructed by transmission/reception itself of the JTX TF. In this case, the JTX TF can be transmitted at a timing according to the timing when the AP 102 and the AP 104 should transmit the radio frame to the STA 105. Alternatively, information for designating the transmission timing may be included in the frame of the JTX TF. In this case, using the designated transmission timing and a timer or clock in the self-device, the AP 102 and the AP 104 can decide when the radio frame should be transmitted. As described above, using the JTX TF, the AP 102 and the AP 104 can synchronously transmit the radio frame.

Note that in the data transmission at this time, the BSS color used in the BSS (the AP connected to the STA) to which the STA as the data transmission target belongs is set in the PHY preamble in the radio frame. In the example shown in FIG. 7, BSS color2 used in the BSS2 to which the STA 105 as the data transmission target belongs is set in the radio frame. That is, the AP 104 transmits the radio frame directly using BSS color2 used in the self-device, and the AP 102 transmits the radio frame using BSS color2 different from BSS color1 used in the self-device. The BSS color of the BSS1 formed by the AP 102 is not changed from BSS color1. That is, the AP 102 does not change the BSS color of the BSS formed by the self-device. However, to transmit data by JTX, the AP 102 sets, in the radio frame, the BSS color used in the BSS to which the STA as the transmission destination of the data belongs and transmits the data. At this time, the AP 102 can transmit the data to the STA (STA 103) connected to the self-device even if the AP 102 is operating in the JTX mode. In this case, the AP 102 can set, in the radio frame, BSS color1 used in the BSS1 formed by the self-device and transmit the data. That is, during the operation in the JTX mode, the AP 102 sets the BSS color of the BSS to which the STA belongs in the radio frame and transmits the data. This also applies to the AP 104. That is, the AP 104 uses BSS color2 in the BSS2 formed by the self-device. However, for example, if the AP 102 instructs to transmit data by JTX to the STA 103, the AP 104 can transmit a radio frame for which BSS color1 is set to the STA 103. Note that at this time, the AP 104 does not change the BSS color of the BSS2.

Since each AP does not change the BSS color in the BSS formed by the self-device, the connected STA is never instructed to change the BSS color. For this reason, the setting of the STA is never unnecessarily changed, and, for example, an increase in the power consumption of the STA can be suppressed. On the other hand, in JTX, since the BSS color in the PHY preamble of the radio frame is set in accordance with the BSS to which the STA belongs, the STA can receive the radio frame without changing the setting of the BSS color in JTX.

According to the present invention, it is possible to appropriately execute a setting for causing a plurality of access points to concurrently transmit data to a terminal.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An access point apparatus that forms a first Basic Service Set (BSS), and transmits a radio frame including a preamble and a data field of a physical layer (PHY),
   wherein the preamble includes:
      a Legacy Short Training Field (L-STF);
      a Legacy Long Training Field (L-LTF) arranged immediately after the L-STF in the radio frame;
      a Legacy Signal Field (L-SIG) arranged immediately after the L-LTF in the radio frame; and
      a Second Signal Field arranged after the L-SIG in the radio frame, wherein
   the Second Signal Field includes a subfield for setting a BSS color, and
   in a case where the access point apparatus, operating as one of a coordinating access point and a coordinated access point, is to transmit the radio frame in a coordinated transmission designated to a single station apparatus, and another access point apparatus, operating as the other one of the coordinating access point and the coordinated access point, is to transmit another radio frame in the coordinated transmission designated to the same single station apparatus, a same value is set to the subfield of the radio frame transmitted by the access point apparatus and to the subfield of the another radio frame transmitted by the another access point apparatus,
   wherein the access point apparatus and the another access point apparatus perform the coordinated transmission by using a corresponding frequency channel in a corresponding transmission duration.

2. The access point apparatus according to claim 1, wherein in a case where the single station apparatus is associated with a second BSS formed by the another access point apparatus, a BSS color used in the second BSS is set as the value of the subfield of the radio frame to perform the coordinated transmission performed by the access point apparatus and the another access point apparatus.

3. The access point apparatus according to claim 2, wherein the access point apparatus obtains information of the BSS color of the second BSS from the another access point apparatus.

4. The access point apparatus according to claim 2, wherein in a case where the access point apparatus and the another access point apparatus are to perform the coordinated transmission and the single station apparatus is associated with the second BSS, the access point apparatus obtains information of the station apparatus from the another access point apparatus.

5. The access point apparatus according to claim 1, wherein the BSS color used in the first BSS is set as the value of the subfield, in a case where the access point apparatus and the another access point apparatus are to perform the coordinated transmission and the single station apparatus is associated with the first BSS.

6. The access point apparatus according to claim 5, wherein the access point apparatus notifies the another access point apparatus of information of the single station apparatus, in a case where the access point apparatus and the another access point apparatus are to perform the coordinated transmission and the single station apparatus is associated with the first BSS.

7. The access point apparatus according to claim 1, wherein the access point apparatus notifies the another access point apparatus of the information of the BSS color of the first BSS.

8. The access point apparatus according to claim 1, wherein while the access point apparatus is operating in a mode in which the radio frame is transmitted by the coordinated transmission, the value of the subfield is set based on the BSS color of the BSS to which a device of a transmission destination of the radio frame belongs.

9. The access point apparatus according to claim 8, wherein while the access point apparatus is not operating in the mode, the value of the subfield is set based on the BSS color of the first BSS.

10. The access point apparatus according to claim 1, wherein each of the access point apparatus and the another access point apparatus is an access point apparatus complying with IEEE802.11EHT, and the station apparatus is a station apparatus complying with IEEE802.11EHT.

11. The access point apparatus according to claim 1 wherein,
the value of the subfield is determined based on at least whether the access point apparatus performs the coordinated transmission or not.

12. The access point apparatus according to claim 1 wherein,
while a value of the subfield is set to a first BSS color used in a first BSS formed by the access point apparatus, in a case where the access point apparatus transmits a radio frame designated to a first station associated with the first BSS, a value of the subfield is set to a second BSS color used in a second BSS, in a case where the access point apparatus is to transmit the radio frame in a coordinated transmission designated to a second station associated with the second BSS and the another access point apparatus is to transmit another radio frame in the coordinated transmission designated to the second station.

13. The access point apparatus according to claim 1 wherein,
the access point apparatus and the another access point apparatus perform the coordinated transmission by using a corresponding Resource Unit (RU) having the same frequency channel.

14. The access point apparatus according to claim 1 wherein,
the coordinated transmission is performed by using Distributed-Multi Input and Multi Output (Distributed MIMO).

15. A communication method executed by an access point apparatus configured to form a first Basic Service Set (BSS), comprising:

transmitting a radio frame including a preamble and a data field of a physical layer (PHY), wherein
the preamble includes:
a Legacy Short Training Field (L-STF);
a Legacy Long Training Field (L-LTF) arranged immediately after the L-STF in the radio frame;
a Legacy Signal Field (L-SIG) arranged immediately after the L-LTF in the radio frame; and
a Second Signal Field arranged after the L-SIG in the radio frame wherein
the Second Signal Field includes a subfield for setting a BSS color, and
in a case where the access point apparatus, operating as one of a coordinating access point and a coordinated access point, is to transmit the radio frame in a coordinated transmission designated to a single station apparatus, and another access point apparatus, operating as the other one of the coordinating access point and the coordinated access point, is to transmit another radio frame in the coordinated transmission designated to the same single station apparatus, a same value is set to the subfield of the radio frame transmitted by the access point apparatus and to the subfield of the another radio frame transmitted by the another access point apparatus,
wherein the access point apparatus and the another access point apparatus perform the coordinated transmission by using a corresponding frequency channel in a corresponding transmission duration.

16. A non-transitory computer-readable storage medium that stores a program configured to cause a computer included in an access point apparatus to:
form a first Basic Service Set (BSS), and
transmit a radio frame including a preamble and a data field of a physical layer (PHY), wherein
the preamble includes:
a Legacy Short Training Field (L-STF);
a Legacy Long Training Field (L-LTF) arranged immediately after the L-STF in the radio frame;
a Legacy Signal Field (L-SIG) arranged immediately after the L-LTF in the radio frame; and
a Second Signal Field arranged after the L-SIG in the radio frame, wherein
the Second Signal Field includes a subfield for setting a BSS color, and in a case where the access point apparatus, operating as one of a coordinating access point and a coordinated access point, is to transmit the radio frame in a coordinated transmission designated to a single station apparatus, and another access point apparatus, operating as the other one of the coordinating access point and the coordinated access point, is to transmit another radio frame in the coordinate transmission designated to the station apparatus, a same value is set to the subfield of the radio frame transmitted by the access point apparatus and to the subfield of the another radio frame transmitted by the another access point apparatus,
wherein the access point apparatus and the another access point apparatus perform the coordinated transmission by using a corresponding frequency channel in a corresponding transmission duration.

* * * * *